(12) United States Patent
Clement et al.

(10) Patent No.: US 8,086,707 B2
(45) Date of Patent: Dec. 27, 2011

(54) SYSTEMS AND METHODS FOR GRID AGENT MANAGEMENT

(75) Inventors: George Clement, Sterling, VA (US); Ravi Subramaniam, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 875 days.

(21) Appl. No.: 11/173,223

(22) Filed: Jun. 30, 2005

(65) Prior Publication Data

US 2007/0004292 A1    Jan. 4, 2007

(51) Int. Cl.
*G06F 15/173* (2006.01)
(52) U.S. Cl. ........ 709/223; 709/224; 709/203; 709/204; 709/227; 370/392; 455/411
(58) Field of Classification Search ............. 709/223
See application file for complete search history.

(56) References Cited

U.S. PATENT DOCUMENTS

| 5,446,740 | A  | * | 8/1995  | Yien et al. ............. 709/247 |
| 6,466,932 | B1 | * | 10/2002 | Dennis et al. ........... 707/3   |
| 6,697,857 | B1 | * | 2/2004  | Dixon et al. .......... 709/224   |
| 7,260,598 | B1 | * | 8/2007  | Liskov et al. ......... 709/201   |
| 2005/0131898 | A1 | * | 6/2005 | Fatula, Jr. ............. 707/8   |
| 2005/0131993 | A1 | * | 6/2005 | Fatula, Jr. ........... 709/202   |

OTHER PUBLICATIONS

Kumar, Raj; Talwar, Vanish; Basu, Sujoy, "A Resource Management Framework for Interactive Grids", Jul. 14, 2003, Hewlett-Packard Company, HPL-2003-85 (R.1), all pages.*
"Full Armor—GP Anywhere", [online]. FullArmor Corporation, 2004 [archived on Aug. 29, 2005]. Retrieved from the Internet: <URL: http://web.archive.org/web/20050829133823/fullarmor.com/product/gpany.htm>, 3 pgs.
"FullArmor—IntelliPolicy", [online]. FullArmor Corporation, 2004 [archived on Aug. 31, 2005]. Retrieved from the Internet: <URL: http://web.archive.org/web/20050831195714/fullarmor.com/product/intelli.htm>, 2 pgs.
"FullArmor Protects Windows Desktops Against Weak and Missing Security Settings", Retrieved from the Internett: <URL: http://www.fullarmor.com/pr_53105/news-press-archive-detail.htm>, (May 31, 2005), 2 pgs.

* cited by examiner

*Primary Examiner* — Rupal Dharia
*Assistant Examiner* — Hua Fan
(74) *Attorney, Agent, or Firm* — Schwegman, Lundberg & Woessner, P.A.

(57) ABSTRACT

Systems and methods utilize directory services snap-ins to create, maintain, and interpret policies for controlling the execution of grid applications.

24 Claims, 3 Drawing Sheets

SYSTEMS AND METHODS FOR GRID AGENT MANAGEMENT

FIELD

The embodiments of the invention relate generally to grid computing and more particularly to grid agent management.

BACKGROUND

Grid computing uses the resources of a many separate computers connected by a network (usually the Internet) to solve large-scale computation problems or problems that are best solved using distributed computing techniques. For example, grid computing may be used on tasks such as protein folding, research into drugs for cancer, mathematical problems, and climate models. These projects typically work by running as a screensaver on users' personal computers, which process small pieces of the overall data while the computer is not being used.

Grid computing has the ability to aid in solving problems too big for any single supercomputer, while retaining the flexibility to work on multiple smaller problems. Thus grid computing typically executes in a multi-user environment. Furthermore, grid computing may be able utilize the available computing power, and cater for the intermittent demands of large computational exercises.

Grid computing typically involves sharing heterogeneous resources (based on different platforms, hardware/software architectures, and computer languages), located in different places potentially belonging to different administrative domains over a network typically using open standards.

Thus while grid computing provides several advantages, several issues are associated with grid computing. First, grid computing typically requires a central management authority that controls the use of computers participating in the grid. The central management authority determines what application is run when resources become available on a participating grid computer. This can lead to complicated configuration issues.

Second, participating computers must typically expose details about themselves to the central authority. For example, a participating computer will typically expose the available resources capable of being dedicated to a grid application. These details may be exploited by malicious third parties desiring to take control of a grid computer.

DETAILED DESCRIPTION

In the following detailed description of exemplary embodiments of the invention, reference is made to the accompanying drawings that form a part hereof, and in which is shown by way of illustration specific exemplary embodiments in which the inventive subject matter may be practiced. These embodiments are described in sufficient detail to enable those skilled in the art to practice the various embodiments of the invention, and it is to be understood that other embodiments may be utilized and that logical, mechanical, electrical and other changes may be made without departing from the scope of the inventive subject matter. The following detailed description is, therefore, not to be taken in a limiting sense.

In the Figures, the same reference number is used throughout to refer to an identical component which appears in multiple Figures. Signals and connections may be referred to by the same reference number or label, and the actual meaning will be clear from its use in the context of the description.

Figure 1:
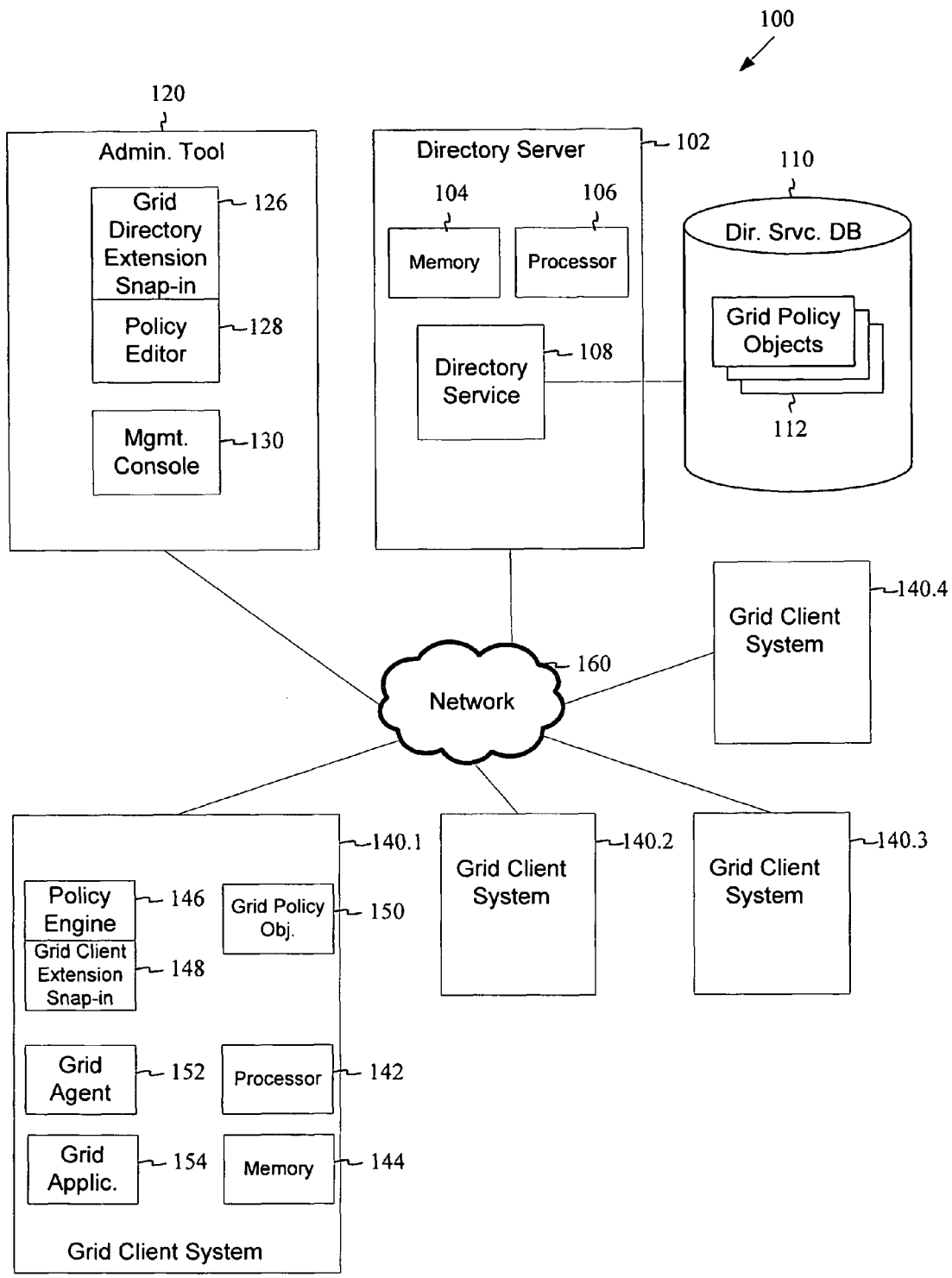
FIG. 1 is a block diagram showing hardware and software components of a system incorporating embodiments of the invention.

FIG. 1 is a block diagram of the major components of a hardware and software operating environment 100 incorporating various embodiments of the invention. In some embodiments of the invention, operating environment 100 includes a directory server 102, administration tool 120, and one or more grid clients 140 coupled by a network 160. Network 160 may be any type of wired or wireless network, and may include a local area network, a wide area network, a corporate intranet, and/or the Internet. The embodiments are not limited to any particular type of network.

Directory server 102 includes a processor 104 and memory 106 to execute a directory service 108. Processor 104 may be any type of computational circuit such as, but not limited to, a microprocessor, a complex instruction set computing (CISC) microprocessor, a reduced instruction set computing (RISC) microprocessor, a very long instruction word (VLIW) microprocessor, a graphics processor, a digital signal processor (DSP), or any other type of processor, processing circuit, execution unit, or computational machine. In some embodiments of the invention, processor 104 may be a processor in the Pentium®, Celeron® or Itanium® family of processors available from Intel Corporation, Santa Clara, Calif. However, the embodiments of the invention are not limited to any particular type of processor. Although only one processor 104 is shown, multiple processors may be present in directory server 102.

Directory service 108 provides directory information to directory clients. The directory information may be provided in response to a request from a client (e.g. a pull model). In some embodiments, directory service 108 comprises the Active Directory® system available from Microsoft Corp. of Redmond, Calif. However, the embodiments are not limited to a particular directory service. Alternative directory services include the Novell Directory Service™ and eDirectory™ from Novell, Inc. of Provo, Utah.

Directory service 108 maintains a database 110 of data and executable objects that may be supplied to a grid agent 152 running on a directory client 140. In some embodiments, these objects include grid policy objects 112. In addition, directory service 108 may provide security and authentication services.

Grid policy objects 112 comprise data structures that contain data and code that define, distribute, and manage rule sets and parameters for executing grid applications 154 on grid clients 140. The grid policy objects 112 may be defined using a policy schema. In some embodiments, the grid policies include one or more rules (instructions) and data that:

provide applications that can be worked by a client when client utilization is low.

provide resource utilization constraints on grid work (including both maximum limits and availability parameters and including combinations of resources)

define the frequency agents look for applications to work on.

provide the addresses of the related services to each grid application.

provide the location of central data repositories for grid applications in the enterprise.

set an affinity level of the applications (i.e. define how "desirable" a client is for a grid application)

define application priorities define user-based priorities define group membership based priorities define time based limitations such as time of day, day of week etc. limitations pre-emption rules (what happens if a higher priority grid application is made available)

constrain grid applications based on proximity to resources such as databases or application servers correlate other applications and services with a grid application It should be noted that the above list of policies is exemplary and that other policies are possible and within the scope of the inventive subject matter.

In some embodiments, the policies, rules and data provided in policy objects 112 may be organized by domain, site, or organization unit (OU). A domain is typically a set of devices and computers that are included in a common name space. For example, for the domain "foo.com", machines identified as "bar.foo.com" and "widget.foo.com" are in the same domain, whereas "widget.xyzzy.com" is not in the "foo.com" domain. A site typically refers to a physical location. An OU is a logical grouping within a domain.

Administration tool 120 comprises software used to manage and maintain grid policy objects through directory server 102. In some embodiments, administration tool 120 includes grid directory extension snap in 126, policy editor 128, and management console 130. Group policy management console 130 provides an interface for administrators to manage group policies for multiple domains and sites within one or more forests of policy objects. For example, the console 130 may provide an interface for performing task such as backup, restore, import, copy, and reporting of group policy objects (GPOs), including grid policy objects 112.

Grid directory extension snap-in 126 provides an interface specialized for accessing grid policy objects 112. A snap-in may also be referred to as a plug-in. In some embodiments, the snap-in 126 comprises a dynamically loadable library or sharable object that may be included in administration tool 120. In some embodiments, grid directory extension snap-in 126 is an Active Directory snap-in.

Policy editor 128 uses grid directory extension snap-in 126 to provide a user interface for creating and modifying grid policy objects 112. The user interface may be a graphical user interface. A user may create or read policy objects into the administration tool 120. Once the user is satisfied with the grid policy object, the user may save the grid policy object into the directory database 110 through directory server 102.

Grid client system 140 comprises a directory client system. Generally such systems may include personal computers, server computers, mainframe computers, laptop computers, portable handheld computers, set-top boxes, intelligent appliances, personal digital assistants (PDAs), cellular telephones and hybrids of the aforementioned devices. In some embodiments, grid client system 140 includes a processor 142 and memory 144 that execute a policy engine 146, grid client extension snap-in 148, grid agent 152 and grid applications 154.

Processor 142 may be any type of computational circuit such as, but not limited to, a microprocessor, a complex instruction set computing (CISC) microprocessor, a reduced instruction set computing (RISC) microprocessor, a very long instruction word (VLIW) microprocessor, a graphics processor, a digital signal processor (DSP), or any other type of processor, processing circuit, execution unit, or computational machine. In some embodiments of the invention, processor 104 may be a processor in the Pentium®, Celeron® or Itanium® family of processors. However, the embodiments of the invention are not limited to any particular type of processor. Although only one processor 142 is shown, multiple processors may be present in grid client system 140.

Policy engine 146 comprises software that reads policy objects such as grid policy objects 112 from a directory server 102. The policy engine 146 may then store a local copy 150 of policies read from directory server 102 locally on grid client 140. In some embodiments, the copy is stored in a registry database for the client system 140.

Grid client extension snap-in 148 reads the local copies 150 of grid policy objects and evaluates the policies using the rules and parameters defined by the policies in light of current resource utilization on the grid client system and establishes application preferences based on the policies. In some embodiments, grid client extension snap-in 148 is an Active Directory extension snap-in.

Grid agent 152 comprises software that participates in a grid computing environment to determine which grid applications may be executed on a grid client 140. Grid agent 152 reads the preferences established by the client snap-in 152, and uses the preferences to determine which, if any grid applications 154 should be executed.

Grid application 154 comprises a software application that performs tasks related to the goal of a distributed grid computing task. For example, grid application 154 may an application that works on a portion of data related to protein folding, research into drugs for cancer, mathematical problems, and/or climate modeling. The embodiments of the invention are not limited to a particular type of grid application.

Further details on the operation of system 100 are provided below with reference to FIGS. 2 and 3.

Figure 2:
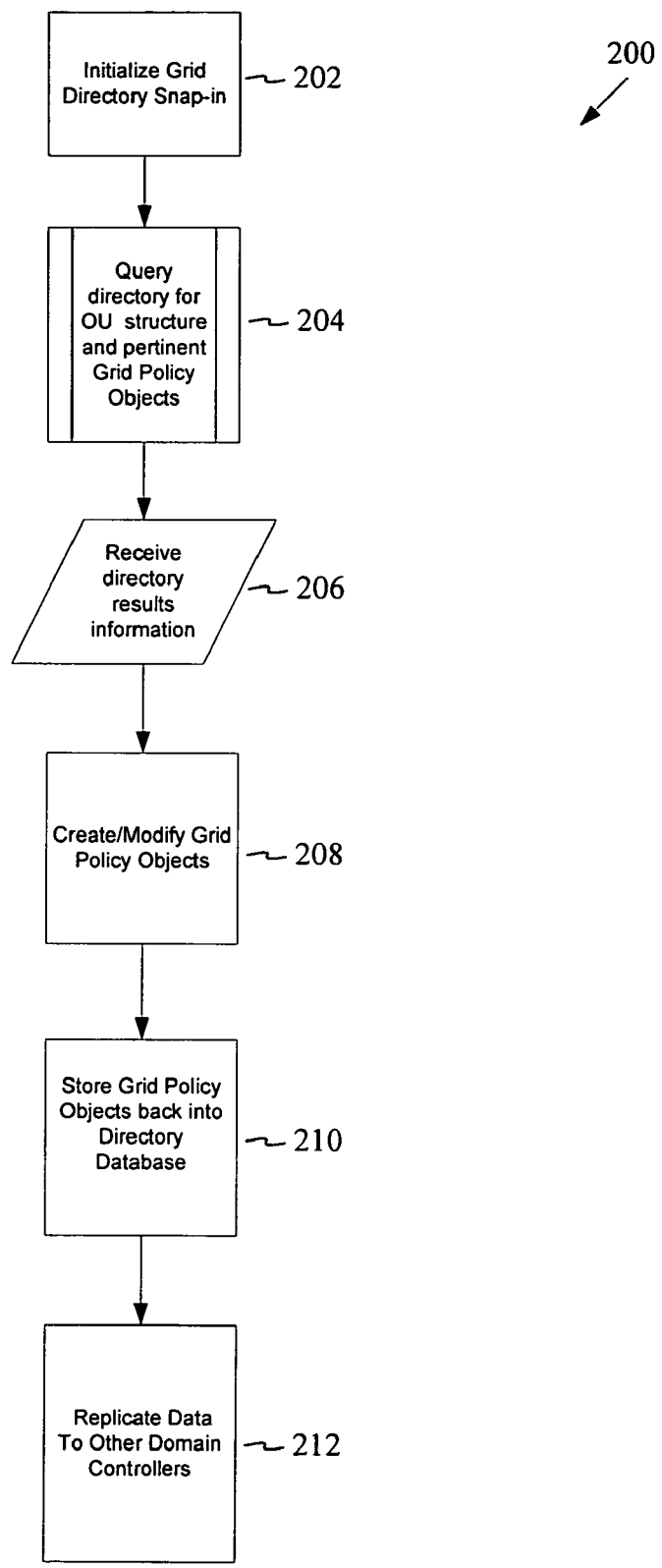
FIG. 2 is a flowchart illustrating a method for maintaining policy information for a directory based grid computing system according to embodiments of the invention.
Figure 3:
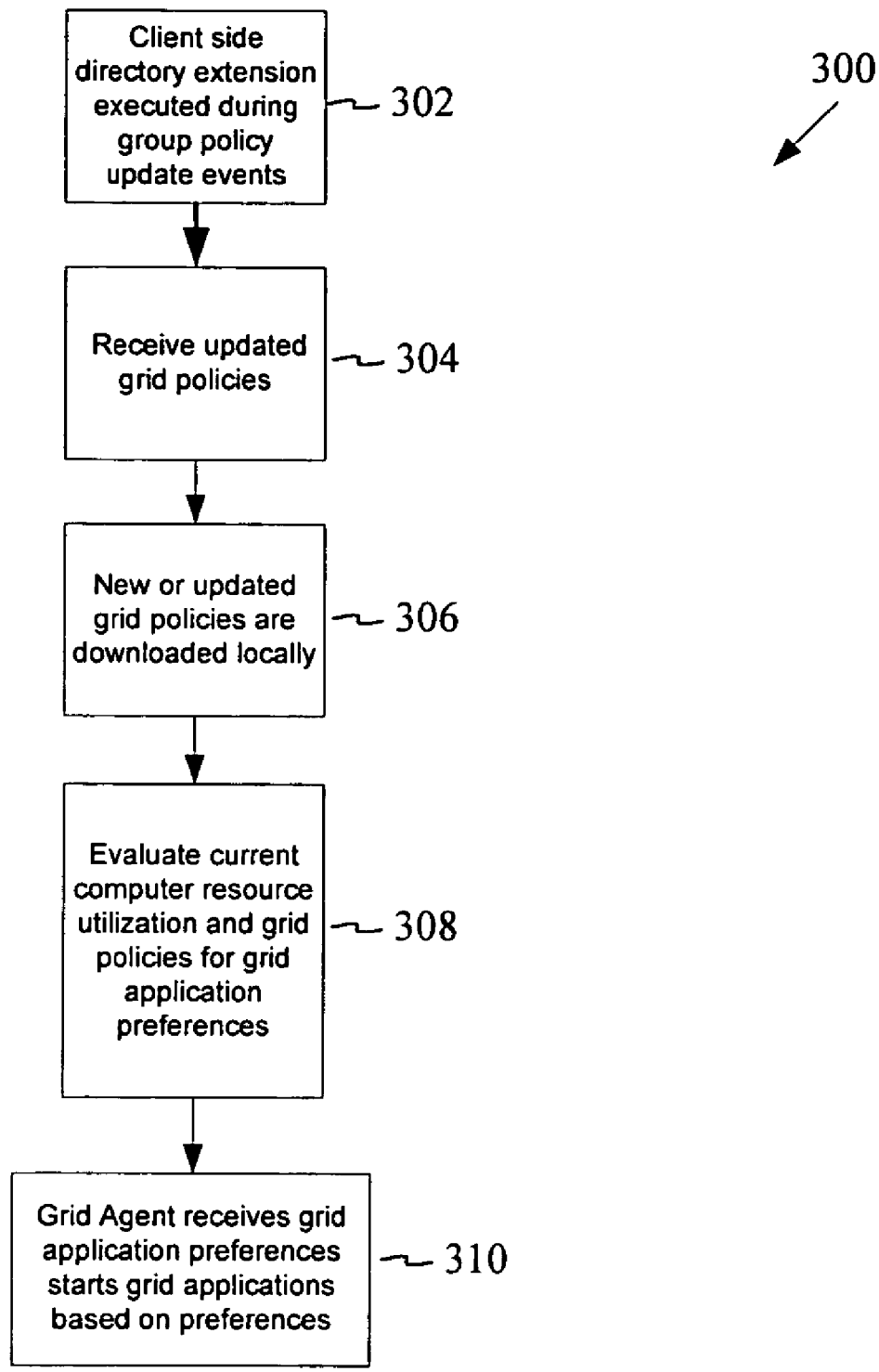
FIG. 3 is a flowchart illustrating a method for utilizing policy information on a participating client in a directory based grid computing system according to embodiments of the invention.

FIGS. 2 and 3 are flowcharts illustrating methods for utilizing directory extension snap-ins to manage and interpret grid policy objects maintained in a directory system such as Active Directory. The methods may be performed within an operating environment such as that described above with reference to FIG. 1 above. The methods to be performed by the operating environment constitute computer programs made up of computer-executable instructions. Describing the methods by reference to a flowchart enables one skilled in the art to develop such programs including such instructions to carry out the methods on suitable computers (the processor of the computer executing the instructions from machine-readable media such as RAM, ROM, CD-ROM, DVD-ROM, hard disk, flash memory etc.). The methods illustrated in FIGS. 2 and 3 are inclusive of the acts performed by an operating environment executing an exemplary embodiment of the invention.

FIG. 2 is a flowchart illustrating a method 200 for maintaining policy information for a directory based grid computing system according to embodiments of the invention. The method starts by initializing a grid directory snap-in (block 202). In some embodiments, the grid directory snap-in is initialized in response to an grid or directory administrator opening an administration tool Next, in some embodiments, the grid directory snap-in queries the directory for domains, site and/or organization unit structures for the grid clients and also for grid policy objects (block 204). As noted above, the grid policy objects define rules and parameters that allow grid clients to determine when to execute grid applications. The grid directory snap-in then receives the results, if any, of the query (block 206).

The grid policy object received at block 206 may then be modified, and new grid policy objects may be created (block 208). In some embodiments, a group policy object editor may be used to perform the modifications to a local copy of the group policy objects and to create new local copies of group policy objects. As noted above, the group policy objects may include rules and parameters that:

provide applications that can be worked by a client when client utilization is low.

provide resource utilization constraints on grid work define the frequency agents look for applications to work on.

provide the addresses of the related services to each grid application.

provide the location of central data repositories for grid applications in the enterprise.

set an affinity level of the applications define application priorities define user-based priorities define group membership based priorities define time of day, day of week etc. limitations define pre-emption rules constrain grid applications based on proximity to resources such as databases or application servers correlate other applications and services with a grid application Group policy objects may be made dependent on membership in a particular domain, site or organization unit.

As an example, a group policy may use one or more of the rules above to indicate that certain grid applications are not to be run if the grid client is a laptop computer.

Next, the local copies of the modified or new grid policy objects may be saved back to the directory service (block 210). In some embodiments, the grid policy objects are saved in an Active Directory database. If the size of the group policy objects is large, the objects may be saved to a "sysvol" directory on a domain controller for the Active Directory system.

In some embodiments, the new or modified group policy objects may be replicated to other directory systems (block 212). In some embodiments, data is replicated to domain controllers for the Active Directory system.

FIG. 3 is a flowchart illustrating a method 300 for utilizing policy information on a participating client in a directory based grid computing system according to embodiments of the invention. The method begins by executing a grid client extension upon the occurrence of a group policy event (block 302). In some embodiments, the event comprises the start-up or shut-down of the grid client system. In addition, the event may comprise the elapsing of a period of time. In some embodiments, the period is ninety minutes; however the embodiments are not limited to any particular update period.

The system then receives any updated grid policy objects (block 304). New or updated rules expressed in the policies may be locally downloaded (block 306). In some embodiments, the rules and policies may be stored in a registry database.

The current client resource utilization is obtained, and the current rules and policies are analyzed using the current client resource utilization data to determine grid application preferences, e.g. which grid applications, if any should be executed and a priority for the grid applications (block 308). In some embodiments, the resource utilization may be analyzed as maximum resource utilization. In alternative embodiments, the resource utilization may be analyzed in terms of available resource capacity.

Finally, a grid application agent utilizes the preferences to start the execution of one or more grid applications (block 310).

Systems and methods for executing grid applications using directory service extension for a directory service have been described. The systems and methods provide a mechanism for a directory client, through the application of predefined policies and rules maintained in policy objects downloaded on the client, to autonomously determine when to run particular grid applications, and what grid applications are appropriate for the client. Although specific embodiments have been illustrated and described herein, it will be appreciated by those of ordinary skill in the art that any arrangement which is calculated to achieve the same purpose may be substituted for the specific embodiments shown. For example, the systems and methods described herein may be applied to other distributed application architectures other than grid architectures. This application is intended to cover any adaptations or variations of the inventive subject matter.

The terminology used in this application is meant to include all of these environments. It is to be understood that the above description is intended to be illustrative, and not restrictive. Many other embodiments will be apparent to those of skill in the art upon reviewing the above description. Therefore, it is manifestly intended that the inventive subject matter be limited only by the following claims and equivalents thereof.

What is claimed is:

1. A method comprising:

reading, by a grid client extension snap-in using one or more processors of a grid client, one or more grid policies for a grid application from a directory server, the one or more grid policies stored in one or more memories, the grid client comprising a client of a directory service, the directory service providing the one or more grid policies, the grid client further to execute the grid application;

storing the one or more grid policies locally on the grid client; and upon the occurrence of a grid client startup event on the grid client, performing the actions of:

determining by the one or more processors of the grid client a resource utilization; and analyzing by the one or more processors of the grid client the resource utilization in accordance with the one or more locally stored grid polices to determine if the grid application is to be executed by the grid client;

wherein the one or more grid policies determine a frequency at which the grid client looks for grid applications to execute; and wherein the grid client extension snap-in conforms to a snap-in format for Active Directory.

2. The method of claim 1, further comprising obtaining one or more executable modules associated with the grid application.

3. The method of claim 1, wherein the one or more policies define a set of one or more grid applications for execution on the grid client.

4. The method of claim 1, wherein the one or more policies define one or more resource limits.

5. The method of claim 1, wherein the one or more policies define a frequency for analyzing resource utilization in accordance with the one or more polices to determine if the grid application is to be executed.

6. The method of claim 1, wherein the one or more policies provides the location of a central data repository to be used by the grid application.

7. The method of claim 1, wherein the one or more policies defines an affinity level for the grid application.

8. A system comprising:
a grid client having one or more processors coupled to one or more memories, the grid client comprising a client of a directory service, the directory service maintaining one or more grid policies, the grid client to execute at least one of a set of one or more grid applications;
a policy agent executable on the one or more processors of the grid client to read one or more grid policies for the grid application from the directory service and to store the one or more grid policies locally on the grid client;
a grid client extension snap-in for a directory service, wherein, upon the occurrence of a grid client startup event on the grid client, the grid client extension snap-in is executable on the one or more processors of the grid client to read the one or more grid policies, determine a resource utilization and to analyze the current resource utilization, and to create grid application preferences for the set of one or more grid applications, and wherein the grid client extension snap-in conforms to a snap-in format for Active Directory; and
a grid agent executable on the one or more processors of the grid client to, in accordance with the grid application preferences, determine if any of the grid applications are to be executed by the one or more processors of the grid client;
wherein the one or more grid policies determine a frequency at which the grid client looks for grid applications to execute.

9. The system of claim 8, wherein the policy agent is operable to obtain one or more executable modules associated with the set of one or more grid applications.

10. The system of claim 8, wherein the one or more policies defines the set of one or more grid applications.

11. The system of claim 8, wherein the one or more policies define one or more resource limits.

12. The system of claim 8, wherein the one or more policies define a frequency for determining if any of the set of one or more grid applications are to be executed.

13. The system of claim 8, wherein the one or more policies provides the location of a central data repository to be used by a grid application in the set of one or more grid applications.

14. The system of claim 8, wherein the directory service comprises the Active Directory service.

15. A non-transitory machine-readable medium having machine executable instructions stored thereon for causing a processor to execute instructions, the instructions including:
reading, by a grid client extension snap-in using one or more processors of a grid client, one or more grid policies for a grid application from a directory server, the one or more grid policies stored in one or more memories, the grid client comprising a client of a directory service, the directory service providing the one or more grid policies, the grid client further to execute the grid application;
storing the one or more grid policies locally on the grid client; and
upon the occurrence of a grid client startup event on the grid client, performing the actions of:
determining by the one or more processors of the grid client a resource utilization; and
analyzing by the one or more processors of the grid client the resource utilization in accordance with the one or more locally stored grid polices to determine if the grid application is to be executed;
wherein the one or more grid policies determine a frequency at which the grid client looks for grid applications to execute; and
wherein the grid client extension snap-in conforms to a snap-in format for Active Directory.

16. The non-transitory machine-readable medium of claim 15, wherein the instructions further include obtaining one or more executable modules associated with the grid application.

17. The non-transitory machine-readable medium of claim 15, wherein the one or more policies define a set of one or more grid applications for execution on the grid client.

18. The non-transitory machine-readable medium of claim 15, wherein the one or more policies define one or more resource utilization constraints.

19. The non-transitory machine-readable medium of claim 15, wherein the one or more policies define a priority for the grid application.

20. The non-transitory machine-readable medium of claim 15, wherein the one or more policies define time based limitations.

21. The non-transitory machine-readable medium of claim 15, wherein the one or more policies defines a resource proximity based constraint.

22. The method of claim 1 further comprising:
upon the expiration of a time period, performing the actions of:
determining by the one or more processors of the grid client the resource utilization; and
analyzing by the one or more processors of the grid client the resource utilization in accordance with the one or more locally stored grid polices to determine if the grid application is to be executed by the grid client.

23. The system of claim 8, wherein upon the expiration of a time period, the grid client extension snap-in is executable on the one or more processors of the grid client to read the one or more grid policies, determine a resource utilization and to analyze the current resource utilization, and to create grid application preferences for the set of one or more grid applications.

24. The machine-readable medium of claim 15, wherein the instructions further include:
upon the expiration of a time period, performing the actions of:
determining by the one or more processors of the grid client the resource utilization; and
analyzing by the one or more processors of the grid client the resource utilization in accordance with the one or more locally stored grid polices to determine if the grid application is to be executed.

* * * * *